United States Patent
Rosenlund

(10) Patent No.: US 9,067,687 B2
(45) Date of Patent: Jun. 30, 2015

(54) PROPULSION SYSTEM WITH MOVABLY MOUNTED ENGINES

(76) Inventor: Gunnar Rosenlund, Bergen (NO)

( * ) Notice: Subject to any disclaimer, the term of this patent is extended or adjusted under 35 U.S.C. 154(b) by 0 days.

(21) Appl. No.: 14/003,037

(22) PCT Filed: Mar. 9, 2012

(86) PCT No.: PCT/NO2012/000027
§ 371 (c)(1),
(2), (4) Date: Sep. 19, 2013

(87) PCT Pub. No.: WO2012/144907
PCT Pub. Date: Oct. 26, 2012

(65) Prior Publication Data
US 2014/0008489 A1 Jan. 9, 2014

(30) Foreign Application Priority Data

Mar. 9, 2011 (NO) .................................. 20110448
Mar. 24, 2011 (NO) .................................. 20110454

(51) Int. Cl.
| | | |
|---|---|---|
| B64D 27/02 | (2006.01) | |
| B63H 5/125 | (2006.01) | |
| B63H 5/08 | (2006.01) | |
| B64D 27/14 | (2006.01) | |
| B64D 27/20 | (2006.01) | |

(52) U.S. Cl.
CPC ......... *B64D 27/02* (2013.01); *B63H 5/08* (2013.01); *B63H 5/125* (2013.01); *B64D 27/14* (2013.01); *B64D 27/20* (2013.01)

(58) Field of Classification Search
USPC ............... 244/56, 55, 54, 67, 51; 114/337
See application file for complete search history.

(56) References Cited

U.S. PATENT DOCUMENTS

| | | | | |
|---|---|---|---|---|
| 1,806,680 | A | * 5/1931 | Hamilton | .................. 244/55 |
| 2,372,247 | A | 3/1945 | Billing | |
| 3,188,025 | A | 6/1965 | Moorehead | |
| 3,302,908 | A | 2/1967 | Lazareff | |
| 3,354,636 | A | 11/1967 | Utrup | |
| 3,735,946 | A | * 5/1973 | Mullins | .................. 244/54 |
| 5,322,243 | A | * 6/1994 | Stoy | .................. 244/45 A |

(Continued)

FOREIGN PATENT DOCUMENTS

| | | |
|---|---|---|
| DE | 961 151 | 4/1957 |
| EP | 0 398 109 A2 | 11/1990 |

(Continued)

OTHER PUBLICATIONS

National Aeronautics and Space Administration Glenn Research Center, "Aircraft Rotations" Jul. 27, 2001, accessed Jun. 12, 2014, https://web.archive.org/web/20010727095047/http://www.grc.nasa.gov/WWW/K-12/airplane/rotations.htm.*

(Continued)

*Primary Examiner* — Joseph W Sanderson
(74) *Attorney, Agent, or Firm* — Francis C. Hand; Carella, Byrne, et al

(57) ABSTRACT

A method for operating an aircraft that is driven forward in the air with a propulsion system in the form of two engines of the jet or propeller type one on each side of the fuselage is disclosed. During forward movement of the plane, the two engines move in a mutual synchronous relationship relative to the longitudinal axis of the plane. The propulsion system is used for aircraft as well as for ships.

12 Claims, 4 Drawing Sheets

(56) References Cited

U.S. PATENT DOCUMENTS

| | | |
|---|---|---|
| 7,150,662 B1 | 12/2006 | Janitz |
| 7,555,893 B2 * | 7/2009 | Okai et al. .................. 60/228 |
| 7,635,104 B1 | 12/2009 | Kusic |
| 8,262,016 B2 * | 9/2012 | Gosling ..................... 244/12.2 |
| 8,480,025 B2 * | 7/2013 | Lafont et al. ............... 244/54 |
| 2008/0264323 A1 * | 10/2008 | Gosling ..................... 114/330 |
| 2009/0084893 A1 | 4/2009 | Balk |

FOREIGN PATENT DOCUMENTS

| | | |
|---|---|---|
| FR | 2943623 A1 * | 10/2010 |
| GB | 788314 | 12/1957 |
| WO | WO 2008/133494 | 11/2008 |

OTHER PUBLICATIONS

Notarstefano, Giusppe and Hauser, John, "Computing feasible trajectories for contrained maneuvering systems: the PVTOL example" Dec. 5, 2011, accessed Jun. 18, 2014, http://arxiv.org/pdf/1112.0879.pdf.*

* cited by examiner

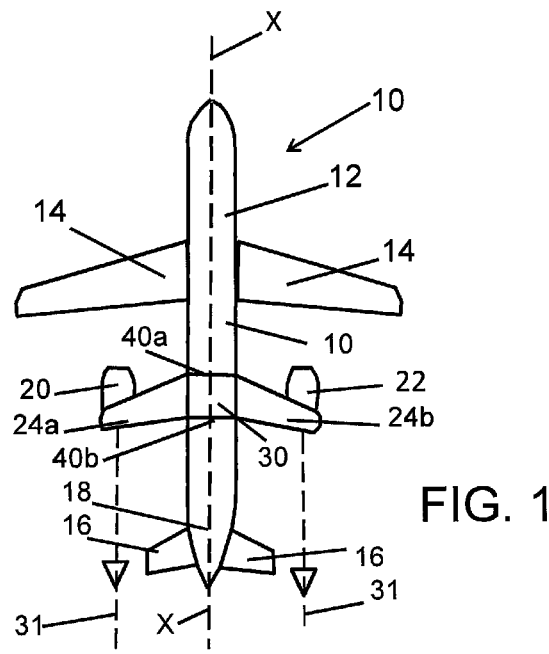
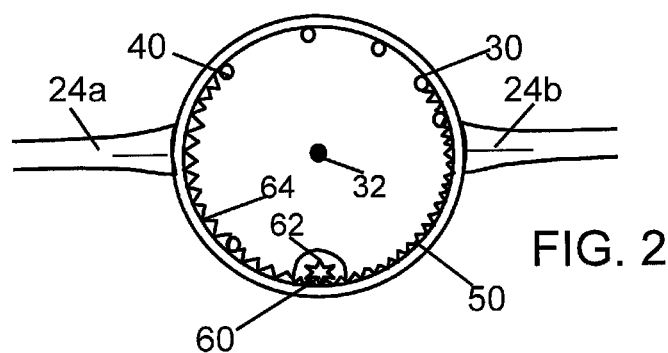

PROPULSION SYSTEM WITH MOVABLY MOUNTED ENGINES

The present invention concerns a method and device for operation of aircraft that is driven forward in the air with a propulsion system in the form of two engines of the jet or propeller type, one on each side of the fuselage.

Furthermore, the invention concerns an analog method and structure for operating-ships.

The invention concerns thus a new design of a propulsion system for aircraft and ships.

The invention is therefore particularly concerned with aircraft driven by propellers (propeller planes) or jet engines (jet aircrafts) mounted to the fuselage or mounted to the wings of the aircraft, and for vessels powered by propellers or water jet engines.

The invention will be explained in the following especially with respect to an aircraft powered by jet engines as well as a similar construction in a vessel with propeller operation. With regard to the prior art, reference is made to U.S. Pat. No. 3,302,908 and GB-788.314. Both of these patents shows aircrafts with engines that can be turned to regulate the direction of thrust power from the engines.

As is known, in jet engine structures with jet engines fixed to fuselage and wings, air is drawn into the engines from the front and combustion gas (exhaust gas) ejects with great force from the back in a straight line backwards, giving the aircraft a propulsion. When the aircraft is at high altitudes, the resistance against the fuselage is lowered due to the thinner air and exhaust flow is visible in a straight line behind the plane as a white vapor trail.

There is a drawback with this fixed engine design, in that the exhaust gas that is expelled, constantly pushes against an exhaust stream that is already moving backwards at a fast rate. Aircrafts with fixed mounted jet engines have, for this reason, a poorer thrust/push off than necessary, something which one aims to remedy in the present invention. It follows hence that the fuel consumption is higher than necessary.

It is therefore an intention to provide a new solution where the ejected exhaust gases from a jet engine may push against air not having a higher speed than the air that constantly flows towards the aircraft from ahead. Furthermore, the intention is to produce solutions that may reduce fuel consumption of the propulsion engines.

Similar considerations of the thrust-conditions can be made for propeller driven aircrafts and for ships/boats operated by one or more propellers and/or water jet units.

The invention employs a rotating propeller that operates to "grab" the air which is thereby pushed backwards as the vessel moves forward. Similar to a jet exhaust trail, the propeller establishes a propeller trail which, if it was visible, looks like a strip behind the vessel.

Air is of course the working medium for an aircraft, while it is water for ships.

The intention is to provide a method and a structure of a propulsion system (jet-/propeller engines) of for aircrafts and ships (water jet-/propeller-system) that may remedy the drawbacks described above.

It is another object of the invention to provide solutions for reducing fuel consumption for aircraft and ships.

It is another object of the invention to use the invention for helicopters.

In one embodiment, the invention provides an aircraft with two engines that are moved in a mutually synchronous manner relative to a longitudinal axis of the aircraft.

For a passenger aircraft with two jet engines attached to a rotatable sleeve on the fuselage, each of the engines may have an air ejection section covering one square meter and, during movement, each engine may traverse approximately 10 square meters of stagnant air. The air drag, i. e. the thrust power, will therefore be approximately 20 times greater on both sides of the aircraft because the ejected air from both engines will form two large air waves, which are at least 10 meters high, where the ejected air presses against the inside of the air waves. Air resistance, that is the thrust power, will therefore be much larger compared with jet engines that are not moved as in the known solutions. A similar consideration can be made where the jet engines are replaced by propellers, in that the exhaust jet trail flow that forms the thrust is replaced by a propeller-trail straight backwards from the propeller.

In another embodiment, for use on a ship, the invention characterized in that it comprises a pair of propeller or water jet systems mounted on either side of a central sleeve tube in the ship, and the propeller or jet engines are mutually moved in a synchronous relationship to a longitudinal direction of the ship.

A similar assessment will also apply to the propulsion of ships by propeller operation. Water speed from the front (for example, along the hull aft towards the propeller) decreases sharply when the propeller is turning. The propeller thus has more time to have a much larger effect on the water between the propeller blades whereas for a non-tilting propeller, water mostly at high speed, is forced backwards between the blades and passes without much contact with them. By moving the propellers, especially a pair that moves in a curved form, the water output speed from the water jet engine/propellers may increase significantly.

The invention will in the following be explained in more detail with reference to the accompanying figures, wherein:

FIG. 1 shows a two-engine jet aircraft that includes the inventive engine design, according to a preferred non-limiting example, where the two engines are mounted to a separate wing structure attached to each side of a rotary drive sleeve surrounding the elongated fuselage.

FIG. 2 shows a construction of the mounting and the rotation of the wing structure with the two engines.

Figure 3:
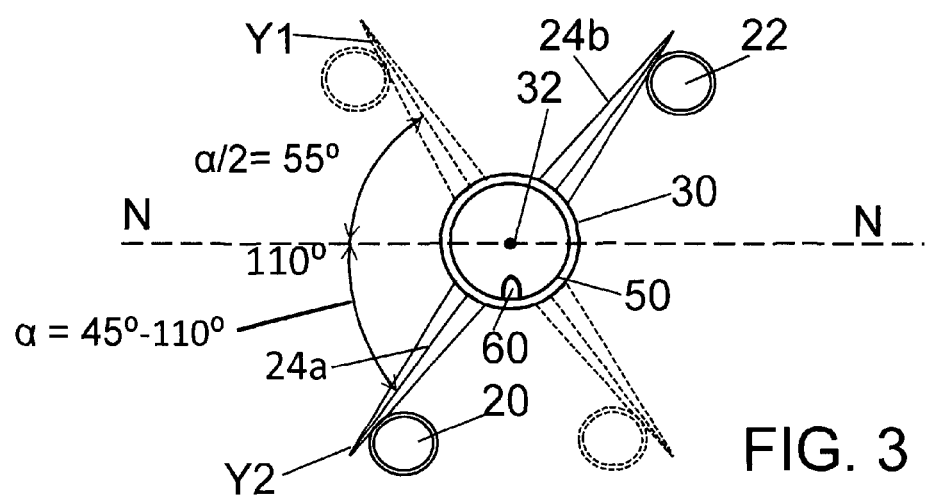
FIG. 3 shows how the two wings and the accompanying engines can be tilted around the longitudinal axis X-X of the aircraft.

FIG. 1 shows an outline plan view from above of an aircraft 10 with a fuselage (hull) 12, a front wing set 14, a rear wing set 16 and a tail control surface 18. Wings and tail control surface are equipped with standard equipment (not shown) to control the aircraft 10.

FIG. 1 shows an aircraft powered by two jet engines, respectively 20 22, similar to that of a passenger aircraft of a Boeing 737 design. In relation to the construction and effect of the present invention, the two jet engines may be replaced by propeller engines.

Instead of the jet engines 20, 22 being attached to the main wings 14, they are attached to an extra set of wings 24a, 24b which are arranged between the main wings 14 and tail wings 16. The wings 24a, 24b are further attached to each side of a separate sleeve 30 that is rotatably attached to the fuselage 12 in a manner that the sleeve 30 is flush with and in line with the fuselage 12. As shown, each wing 24a, 24b may be about half the length of the main wing 14. The length depends of course on aircraft size, as it is important that the jet engine or propeller power remains positioned outside the wing tips of the tail wings 16. The two engines 20, 22 are attached to the sleeve 30 via the two wings 24a, 24b on each side. It is essential that the engines are mounted to the supplemental wings as far out from the sleeve 30, that the exhaust flow cannot meet the two rear wings 16, which would quickly destroy these wings. Jet streams from the engines 20 are shown in FIG. 1 with the broken lines 31, as they lie on the outside and well clear off the tail wings 16.

The wing set 24a, 24b is further designed with a curvature so that they add to the operation of the aircraft in the air similar to the normal front and rear wing sets 14 and 16, respectively.

According to an alternative design, the aircraft type (for example an McDonnel MD80) may be of a type where the engines are mounted on each side of the fuselage 12 in front of the rear wing 16, in this case via suitable mounting structures directly to the sleeve 30 that can pivot about the aircraft's longitudinal axis X-X.

FIG. 2 shows a cross section of the structure of the sleeve 30 and how it can be rotatably anchored to the fuselage, as it is recessed into the hull structure and exterior flush with the rest outer skin of the fuselage 12. In FIG. 2, this construction is only shown generally and schematically. The sleeve, the center of which being shown by reference number 32 (which is located on the aircraft's 10 longitudinal axis X-X) is connected with the rest of the hull construction by means of appropriate mounting structures, such as front and rear ring shaped slide bearing or ball bearing structures, as schematically indicated by reference numerals 40a and 40b in FIG. 2, and arranged around the circumference of the fuselage.

One or more driving gears 50, using preferably electric motors, is/are connected to the hull structure around the inner circumference of the sleeve 30. The drive rod 60 of the drive gear 50 includes external gear teeth 62 arranged to mesh with correspondingly shaped gear teeth 64 inside of the sleeve 30. The teeth 64 inside the pivoting sleeve 30 can form a semicircle as shown in FIG. 2. That means that the fixed shaft 60 may rotate the sleeve around the center 32 over a given angular range. Since the rotary sleeve 30 is subjected to significantly large forces from a jet-drive motor that runs at full thrust, it is advantageous to arrange several such drive systems 60,62,64 around the inner circumference of the sleeve 30 to create the necessary balance. In practice, it should be at least three such drive systems, mutually spaced at approx. 120° degrees. Preferably four drive systems are used mutually spaced at approx. 90° around the perimeter.

FIG. 3 shows the wings 24a, 24b and motors 20, 22 in the normal horizontal position represented by the horizontal line N-N, since they are symmetric about the fuselage sleeve 30 so that the normal horizontal line N-N runs through the center 32 of the sleeve 30 (see FIGS. 2 and 3).

The sleeve 30 and thereby the drive motors 20.22, are designed to rotate about the center 32 over an angular sector a in the range of about 45° to about 110°. With the least effect, this means that the wings 24a, 24b pivot about 22.5° to each side of the horizontal line N-N and a suitable time shift between the two extreme positions Y1 and Y2 can be in the range 3 to 10 seconds. With the greatest effect, this means that the wings 24a,b are pivoted about 55° to each side of the horizontal normal position N-N and a suitable speed and time span between the two extreme positions Y1 and Y2 can be in the range 3 to 15 seconds, preferably 15 seconds.

The sleeve 30 is hollow, and is internally designed with passage capability, for example that it is adapted to form a part of the cabin inside the aircraft, such as the passenger cabin. Furthermore, the wings 24 are hollow and can be designed to include necessary structures of hoses and pipes (not shown) for supplying fuel to the engines 20,22.

When the aircraft is in the air at normal speed, the rotation of one or more drive systems 60 is started by means of the engine (not shown) associated with a computer that is programmed to drive a shaft to turn the jet engines in a given pattern. For example, the turning of the wings 24a,b over 110° between the two extreme positions may occur in cycles of approximately 15 seconds. Meaning that the engines are rotated slowly in a curved form marked B in FIG. 4, after which the direction of rotation turns back to the opposite setting.

According to the invention, the engines are arranged to move mutually synchronously with respect to a longitudinal direction of the plane. This can be accomplished in several ways. One construction is the solution shown where the engines are mounted to a sleeve, such as via a separate wing section, and a turning in a curved shape—B—FIG. 4 about the longitudinal direction is shown specifically here.

It will be apparent that when an engine is displaced in the preferred arcuate form, the exhaust flow or the direction of the thrust power, is maintained from the jet engine all the time, that means it retains the same direction and angle to the aircraft's longitudinal direction.

For the construction of the new system for the operation and the turning of the engines, it is important that the resultant-thrust power does not change in relation to the aircraft's longitudinal direction and progress, meaning that to the greatest extent it is not necessary to actively use the aircraft's other control systems (flaps etc.) to compensate for changes in the thrust moment.

Two Embodiments of Movement.

Figure 4:
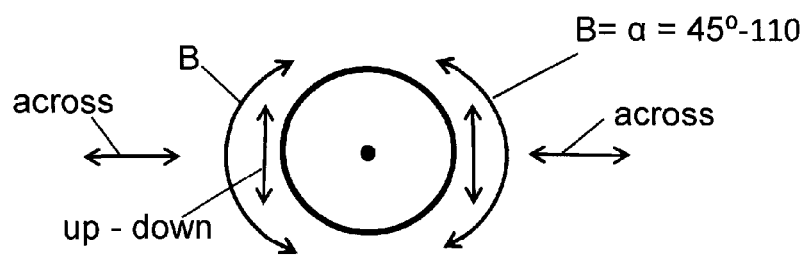
FIG. 4 shows the three different possible ways to tilt the motor set, schematically depicted on one figure.

According to a first variant, each engine 20, 22 is anchored to its corresponding wing 24a,b so that it can be moved generally horizontally out from the fuselage. The engine 20 may for example include a wheel set or slide system that can slide along a rail in the wing 24a, as each wing includes the separate drive system including an engine that can move the two jet engines synchronously horizontally along its respective wing. This is indicated in FIG. 4 with arrows labeled "across". The inward and outward movement of the engines can be carried out at the same rate as for the above solution with the turnable sleeve, with a time span of about 15 seconds and be controlled by the programmable computer.

This variation will not affect the aircraft's flight in the air in such a way that its other controls means, such as flaps, etc. must compensate for changes in torque influences.

According to a second possible variant, each engine that is initially located on the fuselage (similar to the MD80 model) may be reconstructed to be moved upward and downward on each side of the fuselage, mutually in parallel and in respective opposite directions. In such a case, this may cause the aircraft's control means like flaps, etc. to compensate for changes in moment that this setting may cause. This solution assumes that the jet or propeller flow astern does not touch the tail wings or the tail fin. The tail wings of the MD80 aircraft are placed at the top of the tail fin.

The Alternative for the Application of the Invention of Ships.

Figure 5:
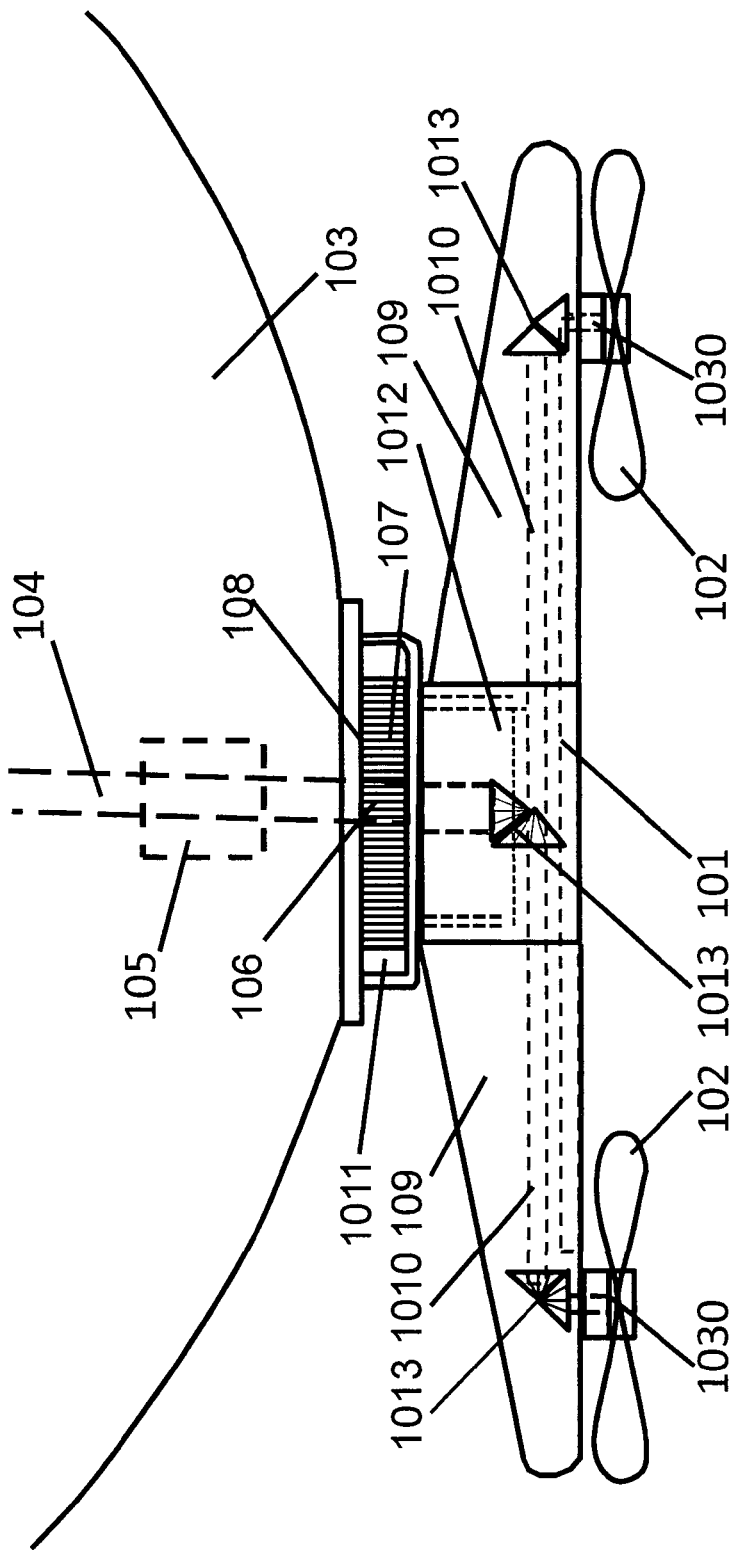
FIGS. 5 and 6 shows the invention applied to a propeller-driven ship seen from above and behind.
Figure 6:
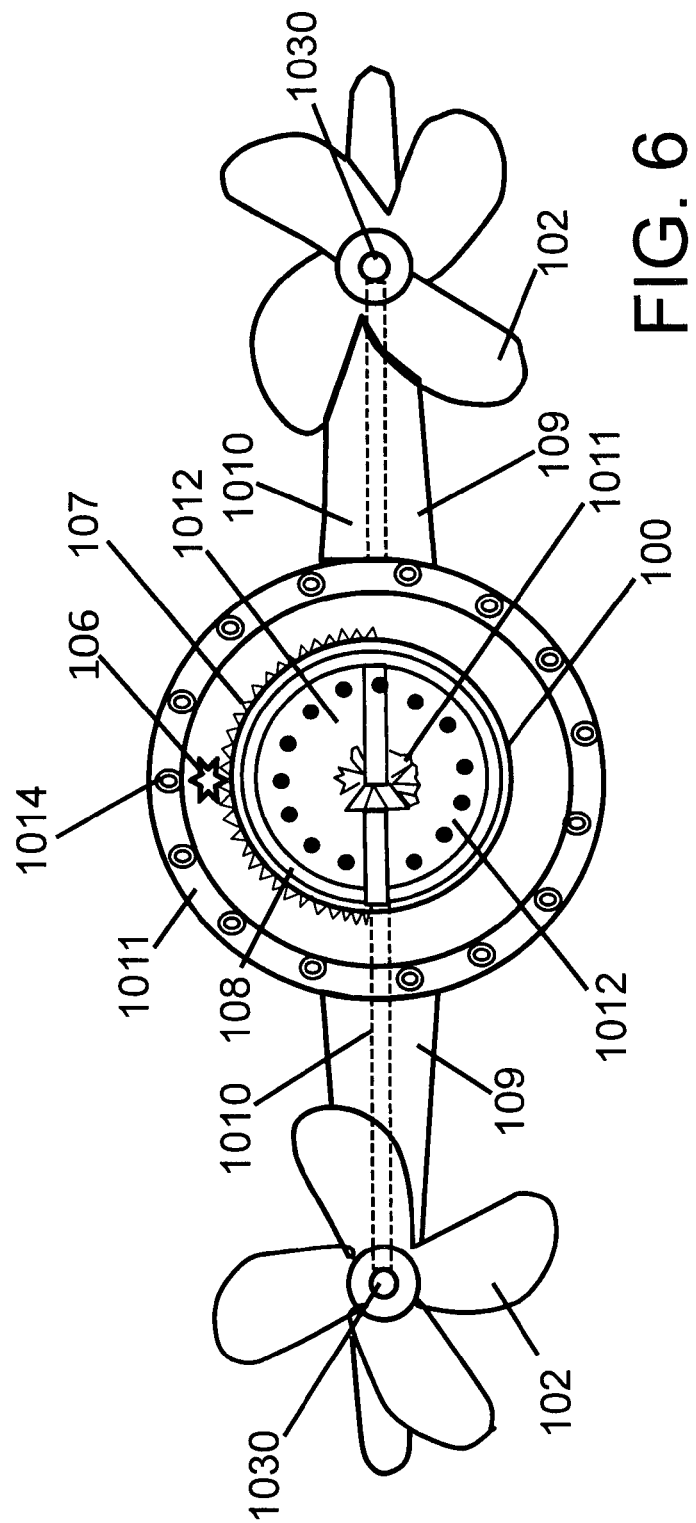

Reference is made to the FIGS. 5 and 6, which show the invention applied to a propeller-driven ship, seen from above and from behind, respectively.

A hull is shown at 103 in FIG. 5, and a ship hull sleeve 1012 is shown extending straight out from the hull 103. A tilt system 101 is arranged around a steel cylinder that is attached to the hull 103. The tilt system 101 includes ball bearings (bearing ring) 8 in the whole of the front perimeter. Each of the wings 109 of the tilt system includes a propeller 102 mounted on the end of each wing 109. The wings are turned upward and downward over a sector of up to 110° as in the other versions mentioned above about the midpoint.

Inside the hull 103 there is an electric motor 105 that can drive a tilt shaft in that the head of a shaft gear-head 106 meshes with the teeth of a ring 107 in a gear transmission construction around the sleeve of the ship's sleeve 1012.

Around the tilt ring 101 towards the ship's hull, a cover is placed over the teeth 107 and the gear 106 of the electric motor 105 and the cover (not shown on figure for convenience) is fastened with screws 1014.

The two propellers 102 are arranged to move in a curved path up and down over a sector of up to approximately 110°, as in the previous example.

The drive means for the tilt system 101 encloses the drive for the two propellers 102. A propeller motor shaft 104 extends forward to a gear drive 1013 for operation of the respective two shafts 1010 to each side, and forward to a further gear transmission for the operation of the shafts 1030 driving the propellers 102.

FIG. 6 shows how the transmission from the longitudinal propeller shaft 104 transmits the power to the transverse shafts 1010 to each side, as this mechanism is arranged inside the sleeve shaped tilt system with the toothed ring 107 and drive head/bearing sleeve 106 and 108, of the tilt shaft.

The two propellers are designed to move in a curved manner up and down over a sector on a total of approx. 110°.

An analog design as discussed here and shown in FIG. 5-6 can be applied using a water jet engine. In that case, the machine that delivers pressurized water is arranged in the hull house just in front of the turning point shown in FIGS. 5-6 and the pressurized water comes across in each direction to the longitudinal water nozzles with longitudinal discharge farthest out on the movable tilting wings.

The purpose of the use of the invention in a ship is the same as for aircrafts, namely that the water flow or jet established by the propeller blades, will hit the water of a lower speed, instead of water already fast moving backward. By synchronously tilting the pair of propellers or water jet nozzles both engine noise and shaking of the ship are reduced.

In the present invention where the jet (water jet) engines are tilted as explained above, the exhaust contrails (water jet for a water jet operation) form a sine-wave pattern behind the engines. Since there is less need for fuel, a more environmental operation of the aircraft/ship is obtained, and noise is reduced.

By alternately tilting the engines upwards and downwards, the exhaust gas that ejects behind the propulsion engine, pushes on the air in the same condition as the air coming in from the front of the aircraft.

The invention claimed is:

1. A method for operation of an aircraft having a propulsion system of two engines of the jet or propeller type one on each side of a fuselage of the aircraft for driving the aircraft forward characterized in that the engines are mounted on opposite sides of a rotary sleeve forming part of the fuselage and the sleeve is rotated around a longitudinal axis of the aircraft during flight of the aircraft to cause the engines to be moved upward and downward in a curved path and in a mutually synchronous relationship around said longitudinal axis between two extreme positions.

2. A method according to claim 1 characterized in that the engines are moved within said curved path in the range of 45° to 110° over a period of up to 15 seconds.

3. A method according to claim 1 characterized in that rotation of said sleeve is brought about by at least one drive rod operated by a motor that is connected to a computer that is programmed to operate the drive rod to rotate the sleeve.

4. A method according to claim 3 wherein each engine is mounted on a respective wing of a pair of wings extending outwardly from said sleeve for movement laterally outwards and inwards of the fuselage under the control of said programmable computer.

5. An aircraft comprising
a fuselage having a longitudinal axis;
a rotary sleeve mounted on said fuselage for rotation about said axis;
a drive means for oscillating said sleeve about said fuselage; and
a propulsion system of two engines of the jet or propeller type, one on each side of said sleeve characterized in that the two engines are designed to be moved upward and downward in a mutually synchronously curved relationship around said longitudinal axis between two extreme positions.

6. The aircraft according to claim 5 characterized in that the engines are moved in a curved path having an arcuate extent from 45° to 110°.

7. The aircraft according to claim 6 characterized in that the two engines are attached to corresponding portions of two wings which are connected to the rotary sleeve and which extend horizontally outward at each side of the sleeve and fuselage.

8. The aircraft according to claim 5 characterized in that the rotating is brought about by one or more operating rods or shafts driven by a motor that is attached to a computer that can be programmed to drive the shaft to rotate the sleeve and thereby the jet engines in a given curved shaped pattern of said curved relationship.

9. The aircraft according to claim 8 characterized in that the engines are mounted for movement laterally of each respective wing under the control of said programmable computer.

10. Structure of a ship with a propulsion machinery which operates a drive system of a pair of propellers or a pair of water jets, one on each side of a longitudinal axis of the ship, characterized in that each propeller or water jet is mounted on the end of a wing which is connected to a common central tube in the ship, and the pair of wings are arranged to pivot mutually synchronously up and down around said longitudinal axis over a sector on a total of 110° relative to said longitudinal as of the ship.

11. Structure according to claim 10 characterized in that the wings are made to move by means of an electric motor inside a hull of the ship driving a tilt shaft, a gear-head of which meshes with teeth in a gear transmission construction around a sleeve in the ship.

12. A propulsion system comprising
a sleeve disposed on a longitudinal axis;
a pair of wings secured to and extending from diametrically opposite sides of said sleeve;
a pair of engines, each said engine being mounted on a respective wing of said pair of wings; and
a drive system for oscillating said sleeve about said axis over an angle of up to 110° to effect synchronous arcuate movement of said pair of engines about said longitudinal axis.

\* \* \* \* \*